(12) United States Patent
Harder

(10) Patent No.: US 11,597,358 B2
(45) Date of Patent: Mar. 7, 2023

(54) DISC BRAKE FOR UTILITY VEHICLES

(71) Applicant: WABCO Europe BVBA, Brussels (BE)

(72) Inventor: Markus Harder, Hockenheim (GE)

(73) Assignee: WABCO Europe BVBA, Brussels (BE)

( * ) Notice: Subject to any disclaimer, the term of this patent is extended or adjusted under 35 U.S.C. 154(b) by 85 days.

(21) Appl. No.: 16/980,257

(22) PCT Filed: Mar. 12, 2018

(86) PCT No.: PCT/EP2018/056060
§ 371 (c)(1),
(2) Date: Sep. 11, 2020

(87) PCT Pub. No.: WO2019/174707
PCT Pub. Date: Sep. 19, 2019

(65) Prior Publication Data
US 2021/0024041 A1   Jan. 28, 2021

(51) Int. Cl.
| | | |
|---|---|---|
| *F16D 65/18* | (2006.01) | |
| *B60T 1/06* | (2006.01) | |
| *F16C 17/02* | (2006.01) | |
| *F16D 55/225* | (2006.01) | |
| *F16D 65/56* | (2006.01) | |

(52) U.S. Cl.
CPC .............. *B60T 1/065* (2013.01); *F16C 17/02* (2013.01); *F16D 55/225* (2013.01); *F16D 65/183* (2013.01); *F16D 65/567* (2013.01); *F16C 2326/01* (2013.01); *F16D 2200/003* (2013.01); *F16D 2200/0021* (2013.01)

(58) Field of Classification Search
CPC ........... F16D 55/225–227; F16D 65/14; F16D 65/18; F16D 65/40; F16D 65/183; F16D 65/567; F16D 2200/0021; F16D 2200/003; B60T 1/065; F16C 17/02; F16C 2326/01
USPC ................................................. 188/71.9, 72.9
See application file for complete search history.

(56) References Cited

U.S. PATENT DOCUMENTS

| | | | | |
|---|---|---|---|---|
| 6,062,353 | A * | 5/2000 | Asai ........................ | F16D 51/24 188/328 |
| 6,269,914 | B1 * | 8/2001 | Angerfors ............. | F16D 65/568 188/71.9 |
| 2009/0159383 | A1 * | 6/2009 | Roberts .................... | F16J 1/008 188/305 |

(Continued)

FOREIGN PATENT DOCUMENTS

| | | |
|---|---|---|
| DE | 10341095 A1 | 4/2005 |
| DE | 102011115212 A1 | 3/2013 |

(Continued)

*Primary Examiner* — Christopher P Schwartz
(74) *Attorney, Agent, or Firm* — Dickinson Wright PLLC

(57) ABSTRACT

A disc brake (1) for a utility vehicle includes a brake disc (19), a brake caliper (2) which surrounds the brake disc (19), an application-side brake lining (3), a rim-side brake lining (3a) and an application-side application device (4) which is arranged in the brake caliper (2). The application device (4) has at least one adjustment spindle (5) and a pressure plate (6) that is arranged axially between the adjustment spindle (5) and the application-side brake lining (3). A plain bearing element (7) is arranged between the pressure plate (6) and the adjustment spindle (4).

8 Claims, 3 Drawing Sheets

(56) References Cited

U.S. PATENT DOCUMENTS

2014/0151163 A1* 6/2014 Plantan ................ F16D 65/567
                                                       188/71.8
2015/0096849 A1* 4/2015 Plantan .................. F16D 65/02
                                                      188/73.46
2020/0408265 A1* 12/2020 Al-Mahshi ............ F16D 65/183

FOREIGN PATENT DOCUMENTS

| DE | 102015110231 A1 | 12/2016 | | |
|----|-----------------|---------|---|---|
| EP | 2690304 A1 | 1/2014 | | |
| EP | 3026286 A2 * | 6/2016 | ......... | F16D 55/2255 |

* cited by examiner

DISC BRAKE FOR UTILITY VEHICLES

CROSS-REFERENCE TO RELATED APPLICATIONS

This application is a 371 national state application and claims the benefit of previously filed International Patent Application No. PCT/EP2018/056060, filed Mar. 12, 2018, the entire content of which is hereby incorporated by reference in its entirety.

FIELD

The invention relates to a disc brake.

BACKGROUND

Disc brakes for vehicles, in particular for utility vehicles, generally have a brake disc and a brake caliper which surrounds the brake disc. Furthermore, in the brake caliper, a rim-side brake lining at the rim side, an application-side brake lining at the opposite of the brake disc, and an application device are arranged. The rim side is defined as the side that faces in the direction of the rim of the vehicle. An application side is intended to be understood to be the region of the disc brake in which the application device is arranged and the application device presses during a braking operation, that is to say, applies, the application-side brake lining against the brake disc. The adjustment device has for applying the application-side brake lining, axially in the direction of the application-side brake lining, an adjustment spindle. A pressure plate is arranged at the end side of the adjustment spindle. The pressure plate is in contact with the application-side brake lining during a braking operation. The pressure plate and the adjustment spindle are connected to each other only by way of a pin of the pressure plate or by way of a pin of the adjustment spindle.

During a resetting operation, that is to say when the adjustment spindle moves axially counter to the direction of the application-side brake lining, the pressure plate may become released from the adjustment spindle.

In addition, a lack of axial securing of the pressure plate during a braking operation at high brake disc temperatures leads to adhesive bonding to the application-side brake lining. This results in defective seals of the adjustment device, and may result in damage to the disc brake. Furthermore, an excessively large freedom of movement between the pressure plate and the adjustment spindle leads to an unacceptable brake wear compensation. The freedom of movement in production and application technology is defined as play. After assembly of the pressure plate with the adjustment spindle, the free movability of the pressure plate against or with the adjustment spindle is defined as play.

One solution for preventing the above-mentioned problems is disclosed in DE 10 2015 114 349 A1. The spindle head has a peripheral or partially peripheral groove in which a retention clamp is guided in order to secure the pressure plate. The end edge of the receiving ring of the pressure plate rests on the retention clamp. In addition, DE 10 2015 114 349 A1 discloses another solution for axially securing the pressure plate to the adjustment spindle. Two grooves are introduced in the pin of the adjustment spindle which is arranged at the end side. The receiving ring of the pressure plate has holes. After the pressure plate has been flange-mounted on the pin of the adjustment spindle, two pins are guided through the holes and the grooves, wherein the two pins fix the pressure plate to the adjustment spindle.

The securing variants, that is to say the retention clamp and the pins, of DE 10 2015 114 349 A1 have the disadvantage that the play between the pressure plate and the adjustment spindle cannot be adjusted in a precise manner. The retention clamp and the pins are used only for axial securing against undesirable release of the pressure plate from the adjustment spindle.

SUMMARY

An object is therefore to improve the prior art mentioned and to provide a securing means which, on the one hand, secures the pressure plate against undesirable release from the adjustment spindle and, on the other hand, enables precise adjustment of the play between the pressure plate and the adjustment spindle.

The object is achieved in that a plain bearing element is arranged between a pressure plate and an adjustment spindle. In contrast to the prior art, the plain bearing element in the installed state cannot become released from the pressure plate or be adjusted in an undesirable manner since the plain bearing element is arranged between the pressure plate and the adjustment spindle. Depending on the dimensions, that is to say depending on the height, width and/or length of the plain bearing element, a different play between the pressure plate and the adjustment spindle can be adjusted. The plain bearing element is preferably constructed in one piece. However, it is also conceivable for the plain bearing element to be composed of two or more individual portions.

The plain bearing element is securely pressed in an end-side recess of the adjustment spindle, that is to say in a rotationally secure manner. A rotation of the plain bearing element is only possible together with a simultaneous rotation of the adjustment spindle. However, a relative movement between the pressure plate and the plain bearing element must always be ensured. The inner diameter of the end-side recess is selected in such a manner that the plain bearing element can be introduced in the end-side recess.

It has further been found to be advantageous for the plain bearing element to be arranged axially on a pressure plate pin of the pressure plate. The pressure plate pin and the pressure plate are formed from a cast component. During an assembly step, the plain bearing element is pushed axially in the direction of the pressure plate onto the pressure plate pin. For simpler assembly and in order to prevent occurrences of incorrect assembly, the pressure plate pin may also act as a locator, by the pressure plate pin and the associated plain bearing element having a special geometry. In other words, the plain bearing element fits only on the pressure plate pin which has the same geometry as an inner wall of the plain bearing element.

In another embodiment, the plain bearing element has at least one stamping. The stamping of the plain bearing element is used, in addition to the sizing of the plain bearing element, to adjust the play between the pressure plate and the adjustment spindle. Using a shaping tool, the stamping of the plain bearing element is introduced into the plain bearing element. A shaping tool is intended in particular to be understood to be a stamping tool. Stamping tools have the advantage of a rapid and uncomplicated positive-locking connection of components. After the arrangement of the plain bearing element on the pressure plate pin, the plain bearing element is stamped using the stamping tool. That is to say, at least at one region of the plain bearing element, a shaping takes place by, in an axial direction of the plain bearing element, at least one stamping in the form of a groove being stamped on the inner wall of the plain bearing element. Advantageously, the groove extends over the entire axial length of the plain bearing element. In the region of the plain bearing element in which the groove is stamped, the outer wall curves radially outward counter to the direction of the pressure plate pin. Preferably, the plain bearing element has three stampings with a spacing of 120 degrees.

Furthermore, it has been found that the pressure plate having with plain bearing element is advantageously arranged axially by means of a pressing operation at an end side of the adjustment spindle in the end-side recess of the adjustment spindle. The pressure plate pin of the pressure plate is pressed with the plain bearing element which is stamped on the pressure plate pin into the end-side recess of the spindle with a pressing tool.

In another advantageous embodiment, the plain bearing element has on the inner wall of the plain bearing element a plastics material coating. During the braking operations, high loads occur between the adjustment spindle and the pressure plate. As a result of the high loads, between the plain bearing element and the pressure plate pin under thermal loading, the plain bearing element may become welded to the pressure plate pin. As a result of subsequent continued movements, for example, as a result of a restoring movement of the adjustment spindle, the plain bearing element is separated from the pressure plate pin again. With each welding and separation operation, material particles of the plain bearing element or the pressure plate pin remain on the pressure plate pin or the plain bearing element and lead to damage to the pressure plate pin and the plain bearing element. The above-described operation is also technically known as "fretting". In order to prevent fretting, the plain bearing element has on the inner face, in the direction of the pressure plate pin, a plastics material coating. With the plastics material coating, the plain bearing element has a degree of sliding ability which prevents welding on the pressure plate pin. The surface of the plastics material coating or the plastics material element is preferably constructed as a planar face.

Furthermore, an inner wall of the plain bearing element is advantageously constructed in a circular manner. Circular geometries, in comparison with other geometries, such as rectangular geometries, can be processed and produced in a simpler manner. However, the inner wall of the plain bearing element is not limited to a circular shape. All other geometries, such as an oval shape, a rectangular shape or a square shape, are also conceivable.

In another advantageous embodiment, the plain bearing element is constructed to axially secure the pressure plate to the adjustment spindle during a return movement of the adjustment spindle which runs counter to the direction of the application-side brake lining. To this end, the plain bearing element is arranged in a positive-locking manner on the pressure plate. In addition, the plain bearing element is introduced in a non-positive-locking manner in the end-side recess of the adjustment spindle.

Another advantage is that the plain bearing element is constructed to produce a play between the pressure plate and the adjustment spindle. The play between the plain bearing element and the pressure plate pin has such dimensions that falling out of the end-side recess of the adjustment spindle or tilting of the pressure plate and resulting diagonal wear of the application-side brake lining, as a result of excessive play between the plain bearing element and the adjustment spindle, is not possible.

Depending on how large the play is intended to be, that is to say the freedom of movement of the pressure plate pin in the adjustment spindle, the plain bearing element is stamped with a higher force or a lower force. A stamping with a higher force results in the play between the pressure plate pin and the adjustment spindle increasing. The opposite occurs with a stamping of the plain bearing element with a lower force. In the case of stamping of the plain bearing element with a lower force, the play between the pressure plate pin and the adjustment spindle in the installed state is smaller. Preferably, the plain bearing element has a width of from 12 mm to 15 mm. In a particularly preferred manner, the plain bearing element has a width of 13.6 mm. The width of the plain bearing element is accordingly adapted to the width of the pressure plate pin. Consequently, the pressure pin is supported completely in the plain bearing element. The inner diameter of the inner wall of the plain bearing element is preferably from 15 mm to 17 mm and is in a particularly preferred manner 16 mm. The inner diameter of the plain bearing element is constructed in accordance with the diameter of the pressure plate pin. In addition, the plain bearing element preferably has an outer diameter of from 17 mm to 19 mm and in a particularly preferred manner of 18 mm. The outer diameter of the plain bearing element is accordingly adapted to the diameter of the end-side recess of the adjustment spindle.

In tests, it has further been shown that the plain bearing element is constructed in a development as a plain bearing bush. With the plain bearing bush, a complete and durable bearing of the pressure plate pin in the end-side recess of the spindle is ensured.

In another advantageous embodiment, the plain bearing element is formed from a metal material. Steel is preferably provided as a metal material. However, other metal materials of aluminum, brass or bronze are also conceivable.

BRIEF DESCRIPTION OF THE DRAWINGS

Selected embodiments of the invention are explained below with reference to the appended drawings, in which.

DETAILED DESCRIPTION OF THE DRAWINGS

Figure 1:
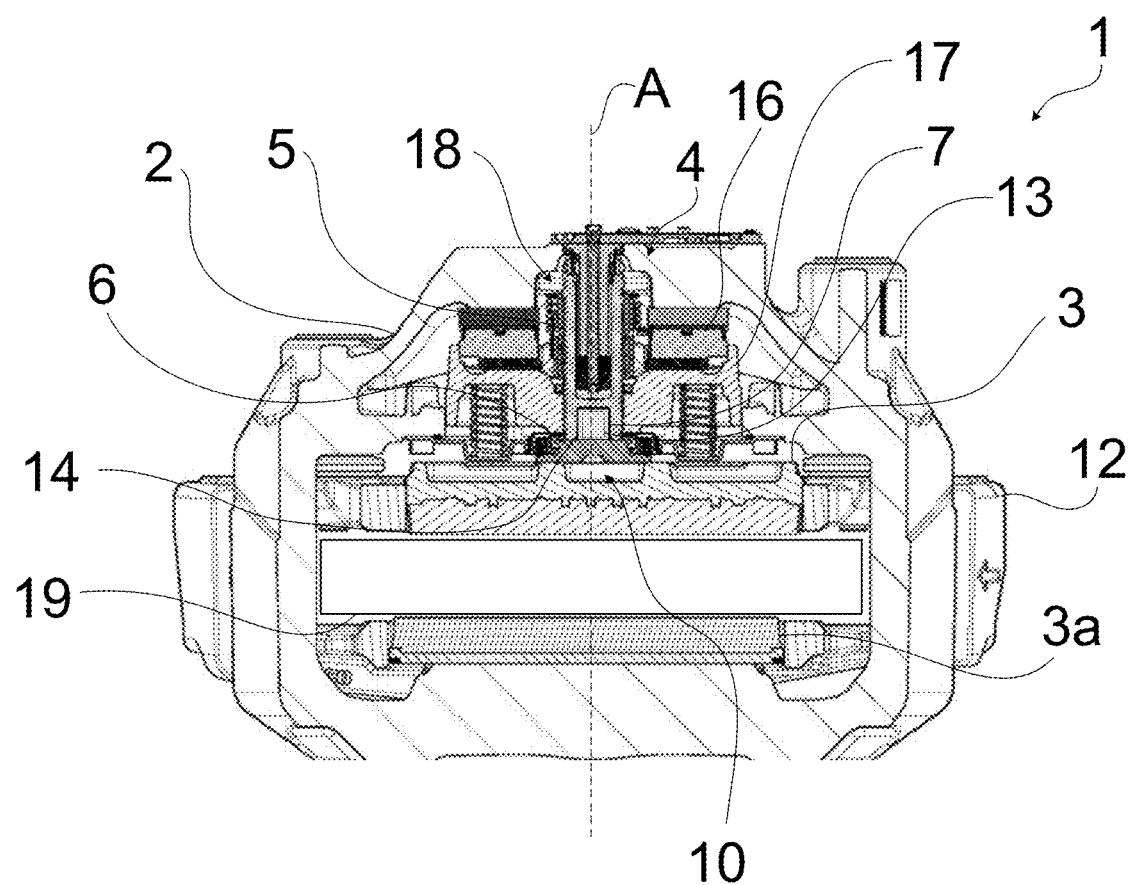
FIG. 1 is a sectioned, schematic view of the disc brake viewed from above.

FIG. 1 shows a disc brake 1 having a brake carrier 12 in which an application-side brake lining 3 and a rim-side brake lining 3a are arranged. A brake caliper 2 surrounds the brake carrier 12, wherein the brake caliper 2 is supported in a sliding manner on the brake carrier 12 in an axial direction A of the disc brake 1. An application device 4 includes an application lever 16, a pressure plate 17, and a re-adjustment device 18 having an adjustment spindle 5 and a pressure plate 6. The application device 4 presses the pressure plate 17 during a braking operation against the application-side brake lining 3 via rotational movement in the direction of the application-side brake lining 3 of the application lever 16. The application-side brake lining 3 in turn presses against a brake disc 19 and brakes the brake disc 19. After a braking operation, the re-adjustment device 18 adjusts the play via the adjustment spindle 5 and the pressure plate 6 arranged on the adjustment spindle 5. The play is intended to be understood to refer to the spacing between the brake disc 19 and the application-side brake lining 3 or between the brake disc 19 and the rim-side brake lining 3a. A plain bearing element 7 secures the pressure plate 6 against falling out of the adjustment spindle 5 during a return movement, that is to say a movement counter to the application-side brake lining 3, of the adjustment spindle 5. A return operation is, for example, carried out in the event of a change of the application-side brake lining 3 and/or the rim-side brake lining 3a. The plain bearing element 7 is arranged in an end-side recess 14 of the adjustment spindle 5 on a pressure plate pin 13 of the pressure plate 6. The end-side recess 14 of the adjustment spindle 5 is axially introduced at an end side 10 of the adjustment spindle 5 facing in the direction of the application-side brake lining 3.

Figure 2:
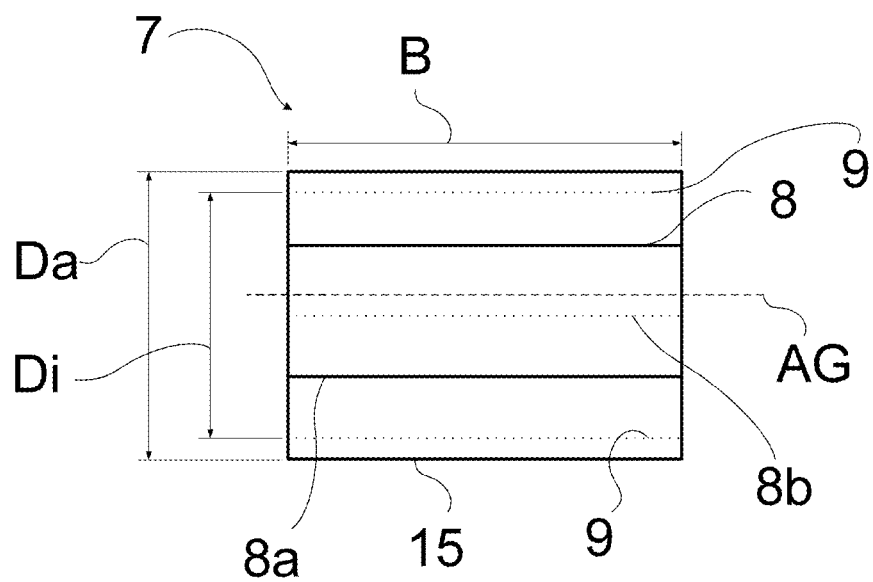
FIG. 2 is a sectioned side view of the plain bearing element.

In FIG. 2, the plain bearing element 7 having an inner wall 9 and an outer wall 15 is shown in detail. The plain bearing element 7 has, in an axial direction AG, a width B of 13.6 mm according to one example aspect. An inner diameter "Di" of the plain bearing element 7 is 16 mm and an outer diameter "Da" of the plain bearing element 7 is 18 mm in this example aspect. On the inner wall 9 of the plain bearing element 7, three stampings 8, 8a, 8b are inserted with a spacing of 120 degrees. The stampings 8, 8a, 8b are formed on the inner wall 9 of the plain bearing element 7 as grooves 8, 8a, 8b and extend over the entire width B of the plain bearing element 7.

In the region of the plain bearing element 7 in which the grooves 8, 8a, 8b are stamped, the outer wall 15 of the plain bearing element 7 curves, in the opposite direction to the inner wall 9 of the plain bearing element, radially outward. Depending on how large the play between the pressure plate pin 13 of the pressure plate 6 and the end-side recess 14 of the adjustment spindle 5 according to FIG. 1 is intended to be constructed, the stampings 8, 8a, 8b are in terms of their dimensions constructed to be smaller or larger using a shaping tool. A dimension is intended to be understood to be the height, width and/or length of the stampings 8, 8a, 8b.

In one embodiment, the plain bearing element 7 is constructed in one piece from steel.

Figure 2A:
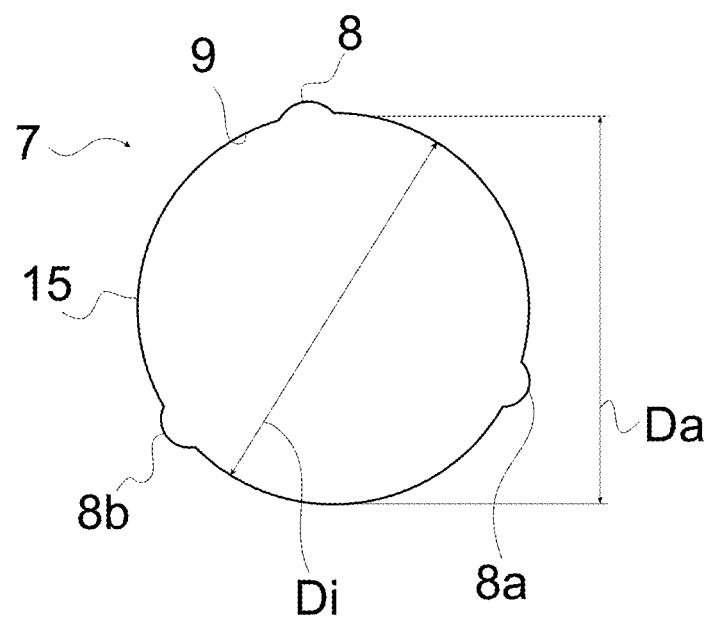
FIG. 2a is a front view of a plain bearing element according to FIG. 2 without a plastics material coating or a plastics material element.

How the plain bearing element 7 appears according to FIG. 2 when viewed from the front is shown in FIG. 2a. In particular, the arrangement of the three stampings 8, 8a, 8b can be seen.

Figure 2B:
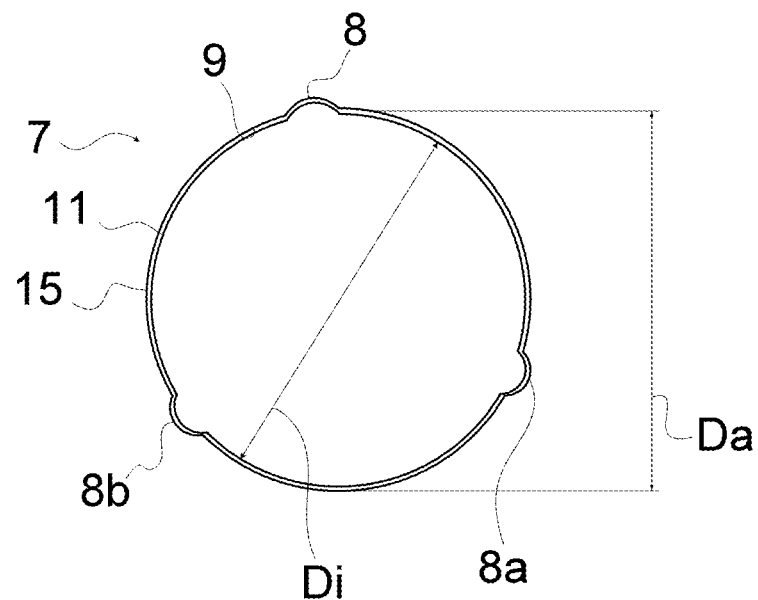
FIG. 2b is a front view of a plain bearing element according to FIG. 2 with a plastics material coating.

In a second embodiment shown in FIG. 2b, the plain bearing element 7 constructed according to FIG. 2 is shown with an additional plastics material coating 11. The plastics material coating 11 prevents contact between the inner wall 9 of the plain bearing element 7 and the pressure plate pin 13. With the additional plastics material coating 11, undesirable wear or damage to the inner wall 9 of the plain bearing element 7 or the pressure plate pin 13 is completely or at least partially prevented.

Figure 3:
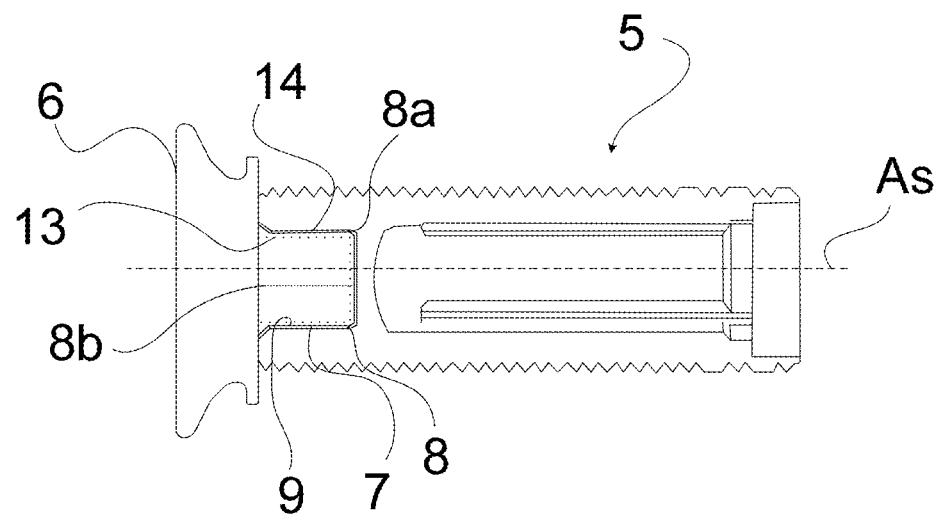
FIG. 3 shows an adjustment spindle having a pressure plate.

FIG. 3 shows the adjustment spindle 5 with the plain bearing element 7 according to FIG. 2 and with the pressure plate 6 arranged in an axial direction As on the adjustment spindle 5 in detail. The end-side recess 14 of the adjustment spindle 5 is constructed in a pot-like manner. The plain bearing element 7 is arranged on the pressure plate pin 13, where the plain bearing element 7 fully surrounds the pressure plate pin 13. Furthermore, the arrangement of the stampings 8, 8a, 8b of the plain bearing element 7 is shown. The stampings 8, 8a, 8b of the plain bearing element 7 are supported on the end-side recess 14 of the adjustment spindle 5.

The invention claimed is:

1. A disc brake (1) for a utility vehicle comprising:
   a brake disc (19),
   a brake caliper (2) surrounding the brake disc (19),
   an application-side brake lining (3), a rim-side brake lining (3a), and an application-side application device (4) arranged in the brake caliper (2),
   wherein the application device (4) includes at least one adjustment spindle (5) and a pressure plate (6), wherein the pressure plate (6) is arranged axially between the adjustment spindle (5) and the application-side brake lining (3),
   wherein a plain bearing element (7) is arranged between the pressure plate (6) and the adjustment spindle (4);
   wherein the plain bearing element (7) is arranged axially on a pressure plate pin (13) of the pressure plate (6);
   wherein the plain bearing element (7) has at least one stamping (8, 8a, 8b);
   wherein the plain bearing element (7) has a cylindrical shape extending axially along the pressure plate pin (13), wherein the at least one stamping (8, 8a, 8b) extends in the axial direction along the cylindrical shape, wherein the at least one stamping is in the form of a corresponding outer projection and inner recess formed in the cylindrical shape.

2. The disc brake (1) as claimed in claim 1, wherein the pressure plate (6) and the plain bearing element (7) are arranged axially via a pressing operation at an end side (10) of the adjustment spindle (5).

3. The disc brake (1) as claimed in claim 1, wherein the plain bearing element (7) includes a plastics material coating (11) on an inner wall (9) of the plain bearing element (7).

4. The disc brake (1) as claimed in claim 1, wherein the plain bearing element (7) has an inner wall (9) and the inner wall (9) of the plain bearing element (7) is constructed in a circular manner.

5. The disc brake (1) as claimed in claim 1, wherein the plain bearing element (7) axially secures the pressure plate (6) to the adjustment spindle (5) during a return movement of the adjustment spindle (5), wherein the return movement runs counter to the direction of the application-side brake lining (3).

6. The disc brake (1) as claimed in claim 1, wherein the plain bearing element (7) defines a play between the pressure plate (6) and the adjustment spindle (5).

7. The disc brake (1) as claimed in claim 1, wherein the plain bearing element (7) is a plain bearing bush (7).

8. The disc brake (1) as claimed in claim 1, wherein the plain bearing element (7) is formed from a metal material.

* * * * *